United States Patent
Hamilton, III

[15] 3,696,896
[45] Oct. 10, 1972

[54] LOCK-UP DEVICE FOR FLUID UNIT

[72] Inventor: Stoddard C. Hamilton, III, 375 Wardlow Road, Highland, Mich. 48031

[22] Filed: Nov. 30, 1971

[21] Appl. No.: 203,375

Related U.S. Application Data

[62] Division of Ser. No. 83,361, Oct. 23, 1970.

[52] U.S. Cl. .......................192/3.28, 192/61, 60/54
[51] Int. Cl. ..............................................F16d 33/00
[58] Field of Search .....................60/54; 192/3.28, 61

[56] References Cited

UNITED STATES PATENTS

| | | |
|---|---|---|
| 2,648,414 | 8/1953 | Maurer.................192/3.28 X |
| 2,652,911 | 9/1953 | Somers.......................192/61 |
| 3,171,513 | 3/1965 | Black et al.................60/54 X |
| 3,240,308 | 3/1966 | Frost...........................60/54 X |

*Primary Examiner*—Edgar W. Geoghegan
*Attorney*—W. E. Finken et al.

[57] ABSTRACT

Hydrodynamic unit having a lock-up device to prevent slip of the rotors subsequent to the attainment of a predetermined input speed. In one form of the invention camming balls are moved outwardly on special ramps in response to rotary drive of the input by centrifugal force of predetermined magnitude to effect the drive engagement of an input driven locking plate and a turbine member. The locking plate is moved from drive engagement with the turbine member by spring means when the magnitude of the centrifugal force developed by the balls is reduced to a predetermined value for torque transmittal through the hydraulic unit. In another form of the invention a centrifugally operated valve closes off an oil exit port of a hydraulic pump operatively disposed between the input and output of the converter or coupling at predetermined input speeds to hydraulically lock the pump and lock-up the hydrodynamic unit. As the magnitude of the centrifugal force developed by the valve diminishes to a predetermined value, spring means moves the valve to open the discharge port so that the pump pumps fluid therethrough allowing the hydraulic operation of the hydrodynamic unit.

5 Claims, 6 Drawing Figures

PATENTED OCT 10 1972 3,696,896

LOCK-UP DEVICE FOR FLUID UNIT

This application is a division of my application Ser. No. 83,361 filed Oct. 23, 1970.

This invention relates to torque transmitting hydrodynamic units and more particularly to centrifugally actuated lock-up devices for torque-transmitting couplings and converters.

Fluid couplings and hydrodynamic torque converters have been extensively used in power transmissions for vehicles to provide for the smooth application of engine power to the drive wheels, to provide slippage to prevent shock loads from being transmitted into the engine and to prevent engine lugging at low vehicle speed. The torque converter further provides for torque multiplication to improve vehicle performance. Slippage of the fluid unit, although providing important benefits, detracts from the efficiency of the transmission. To improve efficiency, lock-up clutches have been employed to prevent slippage of the fluid unit during steady state driving. While many such devices have been proposed their use has been limited since they generally involve costly and complex mechanisms and controls. Some of these prior devices produced high inertia effects and also employed special friction facings on the clutch surfaces which added contaminants to the converter oil.

This invention is drawn to new and improved locking devices for couplings and converters preferably which automatically engage at the coupling stage of operation to prevent rotor slippage and thereby improve operating efficiencies. In a first embodiment of this invention there is a base plate and a locking plate operatively disposed in a fluid unit which are yieldably held together by spring devices with camming balls disposed therebetween. The base plate is secured to an interior wall of a rotary input member of the unit. As input speeds increase, the magnitude of centrifugal force developed by the camming balls forces them radially outwardly on special inclined cam ramps to effect the axial separation of the two plates; this forces the locking plate into drive engagement with a turbine hub member thereby locking the input to the turbine. As input speeds diminish, the force of the spring devices moves the camming balls radially inward on the camming ramps and moves the locking plate from drive engagement with the turbine hub so that the fluid unit transmits torque.

In a second embodiment of the invention a hydraulic pump is disposed within the hydraulic unit between the front plate and turbine hub so that it turns with the relative motion between the turbine and the front cover. At a predetermined input speed a valve is centrifugally actuated to close the oil exit port for the pump so that the pump is hydraulically locked, causing the turbine and cover to rotate as a unit. Below this predetermined speed a spring device moves the valve to a position in which the oil exit port is uncovered so that the hydraulic pump can pump fluid and allow the fluid unit to transmit input torque.

Both embodiments feature small, compact locking units which automatically respond to changing operating conditions of the coupling or converter to appropriately provide for lock-up or hydraulic torque transmission. Inertia effects are minimal with this invention since the components are close to the rotational axis of the hydrodynamic unit. The controls for the units are straight forward, highly reliable and employ a minimal number of components. Positive locking of the converter or coupling is provided with this invention using standard construction such as a gear type hydraulic pump or the connectors joining the turbine to the turbine hub as locking teeth. This invention eliminates the need for special friction material used on most lock-up devices and thereby eliminates the possible contamination of the hydraulic fluid of the hydrodynamic unit by the friction material.

These and other features, objects and advantages of the invention will become more apparent from the following detailed description in which.

Figure 1:
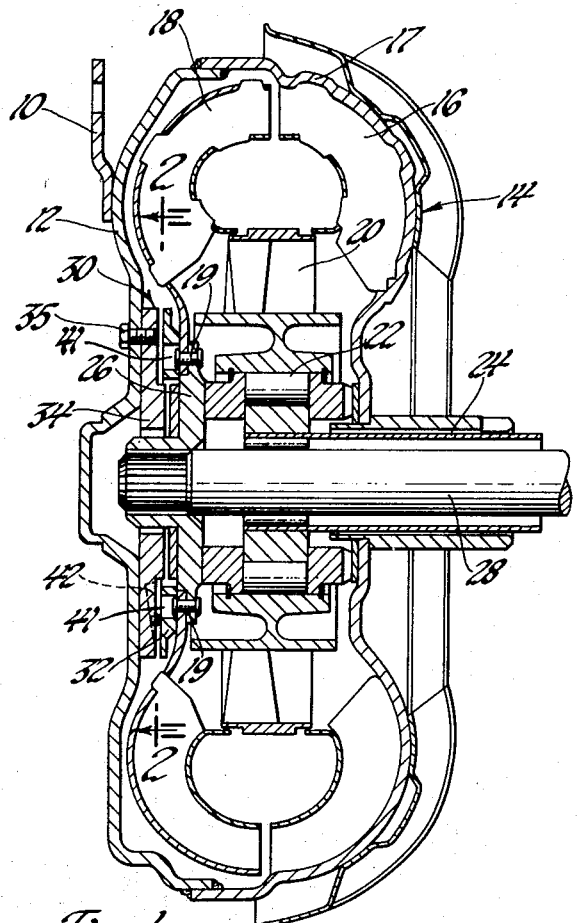
FIG. 1 is a side sectional view of a torque converter.

As shown in FIG. 1 there is an input lug 10 which is drivingly connected to the front cover 12 of a hydrodynamic torque converter 14. The torque converter has a bladed pump 16 operatively connected to the converter housing 17 driven through front cover 12, a bladed turbine 18, and a bladed stator 20. These bladed elements provide a torus for the circulation of transmission fluid during converter operation. The stator is connected by a one-way brake 22 to a ground sleeve 24. The turbine 18 is drivingly connected by rivets 19 to an annular flange portion of a drive hub 26 which is splined to a drive shaft 28.

This converter has a lock-up clutch 30 disposed adjacent to front cover 12 and radially inwardly of the bladed part of the turbine. The clutch comprises an annular locking plate 32 disposed adjacent to the hub 26, a base plate 34 rigidly secured to the front cover of the torque converter by bolts 35, ball members 36 disposed between the base plate and the locking plate, coil springs 38 for yieldably connecting the base plate and the locking plate, and connector pins 40 which extend between the base plate and the locking plate to connect these two plates for rotation together.

Figure 3:
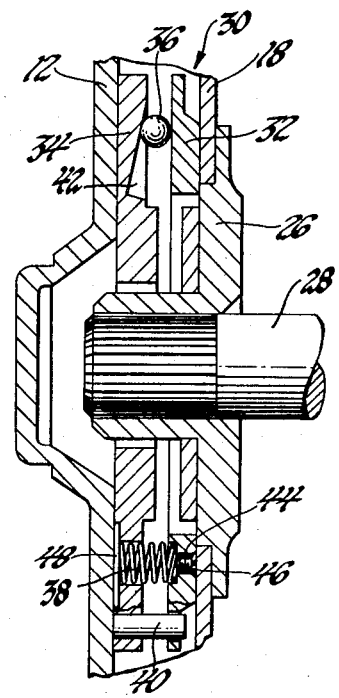
FIG. 3 is a view taken along lines 3—3 of FIG. 2.
Figure 2:
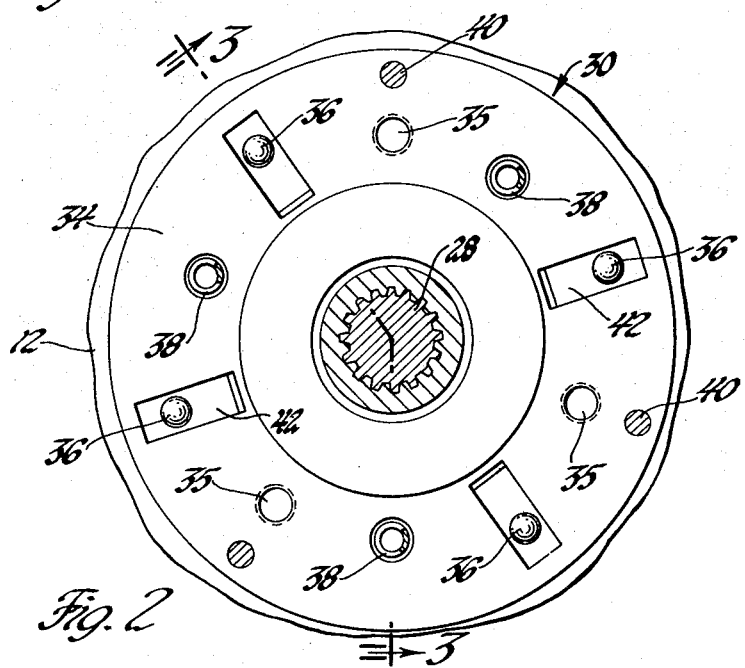
FIG. 2 is a view taken generally along lines 2—2 of FIG. 1.

As best shown in FIGS. 2 and 3 the balls 36 are disposed in radially disposed ramps 42; the depth of these ramps decrease as they extend outwardly. These balls are used to move the locking plate axially so that openings 41 formed in the locking plate can drivingly engage the heads of the rivets 19 connecting the turbine to the hub 26. This occurs as the balls move up the ramps when the pump is driven to a predetermined speed and the magnitude of the centrifugal force is developed by the revolving balls overcomes the opposing forces urging the balls inwardly.

Each spring 38 has a small end 44 which projects into the locking plate and receives a screw 46 to secure the spring to the locking plate. The other end of the spring has a large coil 48 disposed in a recess in the forward side of the base plate to secure the spring thereto. FIG. 2 shows in this embodiment four ball ramp devices and three springs.

In operation, when the input speeds are sufficiently high, the centrifugal force developed by the balls will cause them to move outwardly on the ramps. The outward movement on the balls forces the locking plate 32 axially toward the turbine flange. When the openings 41 in the locking plate drivingly engage the heads of the rivets 19, the converter pump and turbine will be locked for rotation as a unit. This eliminates converter slip during coupling and therefore improves converter slip operating efficiency. When the speed of the input and the connected pump and turbine drops to a predetermined speed the springs retract the locking plate from the rivets 19 to force the balls inwardly on the inclined ramps 42 so that the lock up clutch disengages and the converter operates as a conventional hydraulic torque transmitting unit.

Figure 4:
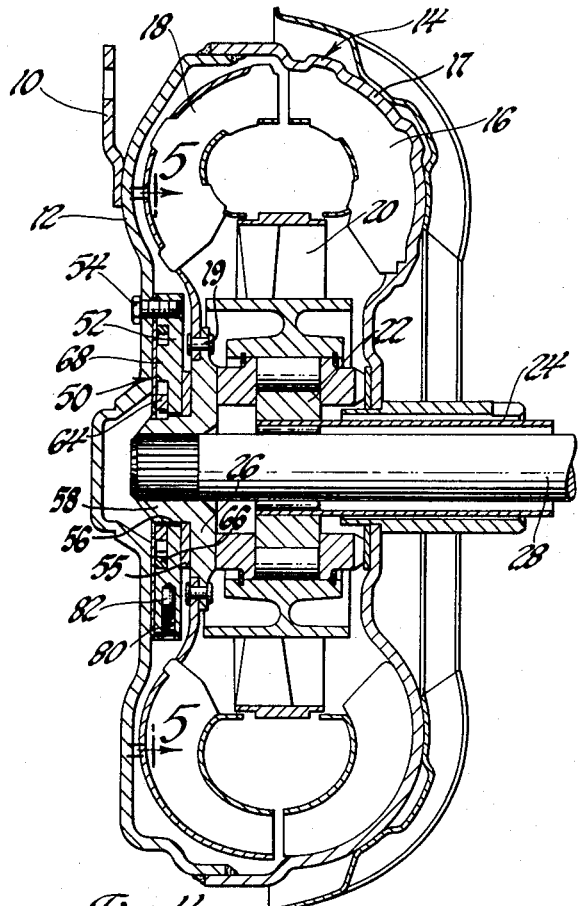
FIG. 4 is a side sectional view of a torque converter illustrating a second embodiment of the invention.
Figure 6:
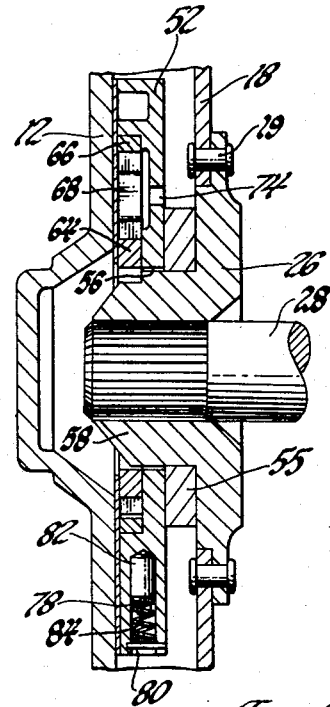
FIG. 6 is a view taken along lines 6—6 of FIG. 5.
Figure 5:
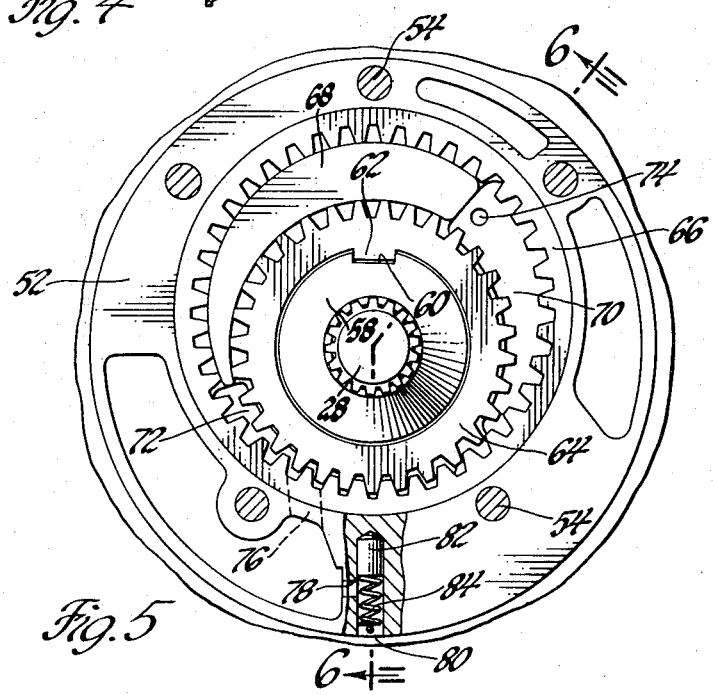
FIG. 5 is a view taken generally along lines 5—5 of FIG. 4.

A second embodiment of the invention is illustrated in FIGS. 4–6. Corresponding parts of the two embodiments are identified by the same reference numerals. In this embodiment there is a hydraulic pump 50 operatively connected between the front cover 12 and the turbine hub 26. The pump has a body 52 secured to the inside of the front cover 12 of the converter 14 by bolts 54. A thrust plate 55 is disposed between the pump body 52 and hub 26. The pump body has an inner annular opening 56 which receives the axial extension 58 of the turbine hub 26 that has a keyway 60 which receives key 62 extending radially inwardly from a pump drive gear 64. This gear meshes with an internal gear 66 as shown best in FIG. 5. A crescent seal 68 formed on the pump body separates inlet port area 70 and outlet port area 72. The inlet port area is fed with converter oil through an inlet passage 74 and is pumped from the outlet port area through passage 76 and then through a passage 78 connected to a radially disposed exhaust bore 80 which is connected to a sump not shown. A valve 82 is mounted for sliding movement in exhaust bore 80 and is urged to a stored position by spring 84 so that passage 78 is open to exhaust through the bore 80. Preferably in all converter operating conditions except coupling, the pump 50 pumps converter oil from inlet passage 74 to exhaust bore 80.

As input speeds increase the rotary speed of the pump body correspondingly increases and the resulting centrifugal force developed by the valve element 82 increases. As soon as this force becomes greater than the force of the spring 84 the valve element 82 will move outwardly in bore 80 to block passage 78 and bore 80 to prevent the exhaust of fluid from pump 50. Under these conditions the pump 50 becomes hydraulically locked with no relative movement between the pump gears. With the pump hydraulically locked the front cover 12 is drivingly connected to the turbine hub to provide a no-slip connection for high efficiency, steady state driving.

When the rotary speed of the input 12 and pump body 52 decreases to a point where the centrifugal force is less than the opposing force of spring 84 the spring will once again push the valve 82 to the stored position illustrated in the drawing to permit the pump to operate and pump fluid supplied through inlet 74 through outlet 78 and bore 80. It will be appreciated that pump 50 is not related to other hydraulic controls and when valve 82 blocks exhaust bore 80, the pressure is dead headed to lock-up the converter.

Although preferred embodiments of the invention have been shown and described other embodiments will now be readily apparent to those skilled in the art. This invention is therefore not to be limited to the particular illustrations and descriptions but only by the following claims.

What is claimed is:

1. In a hydrodynamic unit having input and output rotor means rotatable about a longitudinal axis, a front cover for said unit providing an input operatively connected to said input rotor means, torque transmitting means drivingly connected to said output rotor means, locking means for drivingly connecting said front cover and said torque transmitting means to lock said hydrodynamic unit for unitary rotation and for subsequently unlocking said hydrodynamic unit to provide for the hydrodynamic transmission of torque therethrough, said locking means comprising a pump body fixed to said front cover within said hydrodynamic unit and having a drive gear secured to said output rotor means and having a driven gear meshing with said drive gear, said pump body having an entrance port and an exit port, valve means disposed in said pump body for opening and closing said exit port, spring means for biasing said valve means to a position in which said exit port is opened to permit said pump to pump fluid from said entrance port to said exit port, and said valve means being movable to a position in which said exit port is blocked in response to a predetermined centrifugal force developed by said valve means as said pump body rotates to prevent the pumping of fluid therethrough so that said pump is hydraulically locked to thereby condition said hydraulic unit for unitary rotation and to thereby provide for the direct transmittal of torque from said front cover to said torque transmitting means.

2. In a hydrodynamic unit having input and output rotor means rotatable about a longitudinal axis, a rotatable front cover for said unit providing an input operatively connected to said input rotor means, torque transmitting means drivingly connected to said output rotor means, and locking means for drivingly connecting said front cover and said driven means to lock up said hydrodynamic unit for unitary rotation, said locking means comprising a pump body fixed to said front cover having drive and driven gears, said drive gear being drivingly secured to said output rotor means, said pump having an entrance and an exit port, a radial exhaust passage disposed in said pump body for exhausting fluid from said pump, a valve element disposed in said radial passage, spring means operatively connected in said exhaust passage to move said valve element to a stored position to open said exhaust passage to allow said pump to pump fluid supply from said inlet to said outlet, and said valve being responsive to a force of predetermined magnitude directed away from the center of rotation of said pump body to move into a blocking position to prevent the pumping of fluid therethrough to effect the hydraulic locking of said pump and the drive connection of said input and output rotor means, and said valve being subsequently movable by said spring means to said stored position in response to a predetermined reduction of said force to permit said pump to pump fluid supplied to said entrance to said exit and thereby unlock said input and output rotor means.

3. In a hydrodynamic unit, input rotor means and output rotor means rotatable about an axis of rotation, a rotatable housing drivingly connected to said input rotor means, fluid pump means disposed in said hydrodynamic unit adjacent to said output rotor means for automatically locking said input and output rotor means together when said housing rotates at a speed above a predetermined rotary speed and for automatically unlocking said input and output rotor means when said housing is rotating at a speed below said predetermined speed, said fluid pump means having fluid inlet and outlet passages and having a first member drivingly connected to said input rotor means and further having a second member drivingly connected to said output rotor means, a valve for controlling the flow of fluid through said pump means, said valve comprising a movable valve element, guide means for said valve element, yieldable means for exerting a force on said valve element to move said valve element to a first position allowing said pump means to pump fluid from said inlet passage to said outlet passage, said valve element means being movable to a second position in response to a predetermined centrifugal force developed thereon when one of said rotor means reaches a predetermined speed to block said outlet passage to hydraulically lock said fluid pump and thereby lock said hydrodynamic unit.

4. In a hydrodynamic unit having input and output rotor means rotatable about an axis of rotation, said unit having a housing providing an input operatively connected to said input rotor means, an output member operatively connected to said output rotor means, lock-up means for said hydrodynamic unit, said lock-up means comprising fluid pump means operatively connected to said housing and said output rotor means, said pump means having a fluid inlet passage and a fluid outlet passage operatively disposed within said unit, centrifugally operated valve operatively connected to said outlet passage and movable into a blocking position to block said outlet passage in response to the development of a predetermined centrifugal force thereon to hydraulically lock said pump means and thereby lock said input and output rotor means together, and means for moving said valve from said blocking position in response to the removal of said predetermined force from said valve means to thereby allow said pump means and hydrodynamic unit to hydraulically operate.

5. In a hydrodynamic torque transmitting unit comprising a rotatable housing, input rotor means operatively connected to said housing, output rotor means adapted to be hydraulically driven by said input rotor means, said output rotor means being disposed adjacent to said input rotor means and cooperating therewith to define a torus for the circulation of a working fluid supplied thereto, output means operatively connected to said output rotor means, a fluid pump disposed in said housing having an intake and an outlet passage, said pump being operatively connected between said housing and said output rotor means for pumping fluid from said intake to said outlet passages, said pump having first pump means operatively connected to said housing and having second pumping means operatively connected to said outlet rotor means and closure means for said outlet passage movable between first and second positions for blocking the flow of fluid through said pump when in said second position thereby locking said pump means and said hydrodynamic unit so that the unit input and output rotor means rotate at the same speed, and means to move said closure means from said second to said first position to allow said pump to pump fluid from said inlet to said outlet passage thereby permitting said input rotor means to hydraulically drive said output rotor means.

* * * * *

PO-1050
(5/69)

UNITED STATES PATENT OFFICE
CERTIFICATE OF CORRECTION

Patent No. 3,696,896      Dated October 10, 1972

Inventor(s) Stoddard C. Hamilton, III

It is certified that error appears in the above-identified patent and that said Letters Patent are hereby corrected as shown below:

On the title page, the Assignee -"General Motors Corporation, Detroit, Mich." has been omitted.

Signed and sealed this 1st day of May 1973.

(SEAL)
Attest:

EDWARD M.FLETCHER,JR.
Attesting Officer

ROBERT GOTTSCHALK
Commissioner of Patents